No. 608,267. Patented Aug. 2, 1898.
A. PARTRIDGE.
FRUIT KNIFE.
(Application filed Sept. 1, 1897.)

(No Model.)

Witnesses:
H. B. Hallock
S. S. Williamson

Inventor:
Andrew Partridge
by Geo. H. Holgate
Attorney

THE NORRIS PETERS CO., PHOTO-LITHO., WASHINGTON, D. C.

UNITED STATES PATENT OFFICE.

ANDREW PARTRIDGE, OF SPRINGFIELD, MASSACHUSETTS.

FRUIT-KNIFE.

SPECIFICATION forming part of Letters Patent No. 608,267, dated August 2, 1898.

Application filed September 1, 1897. Serial No. 650,231. (No model.)

*To all whom it may concern:*

Be it known that I, ANDREW PARTRIDGE, a citizen of the United States, residing at Springfield, in the county of Hampden and State of Massachusetts, have invented a certain new and useful Improvement in Fruit-Knives, of which the following is a specification.

My invention relates to a new and useful improvement in fruit-knives, and especially to that class known as "orange-peelers," and has for its object to provide a cheap and effective device which may be used for cutting or peeling all kinds of fruit, but especially for the peeling of oranges; and a further object of my invention is to make the orange-peeling end of the blade adjustable, so as to determine the depth to which it should cut, in order to adapt it for use in connection with thin or thick skinned oranges.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
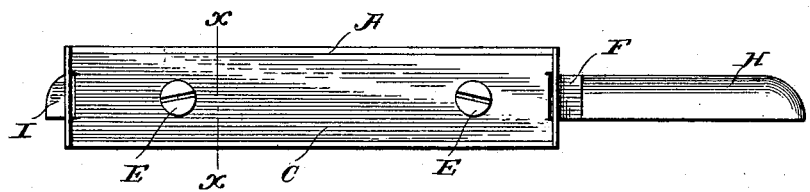
Figure 2:
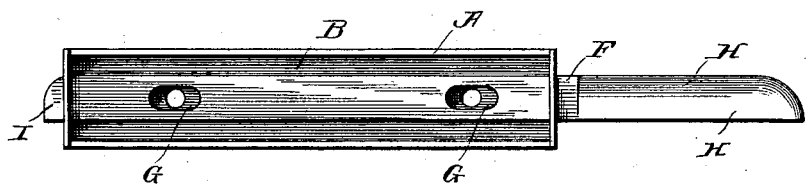
Figure 3:
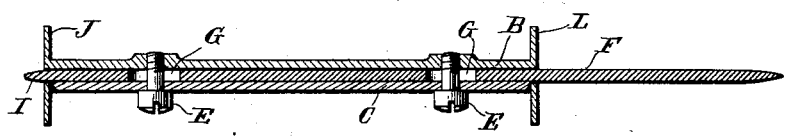
Figure 4:
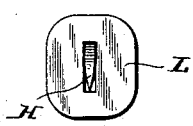
Figure 5:
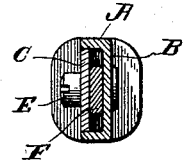

Figure 1 is a side elevation of a knife made in accordance with my improvement; Fig. 2, a similar view showing one of the plates of the handle removed; Fig. 3, a longitudinal section illustrating the arrangement of the blade relative to the handle and means for adjusting the same; Fig. 4, an end view of the orange-peeler, and Fig. 5 a section at the line *x x* of Fig. 1.

In carrying out my invention as here embodied I provide a handle A, which is composed of a plate B, having its longitudinal edges inturned, so as to receive the plate C, which forms the other member of the handle. These plates are secured together by the screws E, and the blade F is adapted to fit between the plates, as clearly shown, and has formed therein the slots G, through which the screws pass, so that when these screws are loosened the blade may be adjusted by being slid lengthwise within the handle, after which the seating of the screws will hold the blade in its adjusted position.

The long end of the blade, as indicated at H, is for any purpose to which a fruit-knife may be put, while the short end I, which just projects beyond the rear end of the handle, is especially adapted for the peeling of oranges and the like, and in order to facilitate this operation the guards J project from the handle, and in operation the outer surface of these guards bear against the fruit being operated upon, thus limiting the depth to which the point I of the blade can penetrate. The adjustment of this point relative to the handle, as already stated, will determine the depth which the blade may cut, the object being to provide for the peeling of oranges the rinds of which are of various thicknesses. I also prefer to have a guard L formed with the front end of the knife, thus protecting the hand of the user against the liability of injury.

One of the principal advantages of my improvement is its exceeding simplicity and the fact that it thoroughly accomplishes the result for which it is intended and may be used by a person of little or no skill.

I am aware that slight modifications might be made in the construction here shown and described without departing from the spirit of my invention, and I therefore do not wish to be limited to these exact details.

Having thus fully described my invention, what I claim as new and useful is—

As a new article of manufacture, a fruit-knife consisting of a plate having its longitudinal edges inturned to produce flanges, guards formed at the ends of the plate and projecting outwardly on either side thereof, said guards being slotted on one side along the edge of the plate, a second plate of such dimensions as to fit between the flanges and guards of the first-named, a blade fitted between the plates and projecting through the slots in the guards at each end, said blade being slotted and screws passed through one plate into the other through the slots in the blade, as and for the purpose set forth.

In testimony whereof I have hereunto affixed my signature in the presence of two subscribing witnesses.

ANDREW PARTRIDGE.

Witnesses:
 MARCUS P. SCHENCK,
 EDMUND P. KENDRICK.